Feb. 18, 1958 N. G. BUSCH 2,823,852
DIRECT DRIVE BLOWER UNIT
Filed May 3, 1954

INVENTOR.
NORMAN G. BUSCH
BY Walter C. Kelsey
ATTORNEY

United States Patent Office 2,823,852
Patented Feb. 18, 1958

2,823,852

DIRECT DRIVE BLOWER UNIT

Norman G. Busch, Columbia Station, Ohio, assignor to Air Controls, Inc., Cleveland, Ohio, a corporation of Ohio Application May 3, 1954, Serial No. 427,094

6 Claims. (Cl. 230—117)

This invention relates to conventional double inlet blower units or air circulating devices, of the type commonly used as furnace booster and the like. More specifically, it relates to a novel manner of disposing the motor centrally of the interior of the blower housing, mounting a separate blower wheel on each side of the motor and providing a direct motor drive for the blower wheels.

A direct motor drive construction is considered the most desirable and efficient means for driving a blower wheel. In some instances motors have been mounted at the end of the blower wheels where they obstruct the free flow of air into the blower, and hence are undesirable for best operating efficiency. In other instances motors are mounted on the top of the blower housing. In either of the foregoing situations a motor-driven belt drives a sheave mounted on the blower wheel shaft. Such constructions are more costly to install than a direct drive unit and require frequent adjustments and replacements.

I have discovered, that by mounting the motor centrally of the blower housing, providing a pair of identical blower wheels and mounting one wheel on each side of the motor, a balanced direct-driven blower unit is provided, which permits unobstructed inlet of air at both sides of the blower wheel, and produces ideal outlet air velocity. Such construction permits low construction costs and provides equal distribution of load on both motor bearings, thus assuring long motor life.

Therefore an object of this invention is to provide a direct-drive blower unit having unobstructed inlets at both blower wheel ends providing smooth and efficient air flow.

Other objects are to mount the motor within the blower housing, provide equal loads on both bearings, and to provide a rigid motor support.

Other objects are to provide a blower unit which is entirely free of exterior bearings, brackets, sheaves, belts, mountings, or other parts which may obstruct air flow at the inlets.

Still other objects are to provide a blower wheel unit, adapted to be produced at a relatively low cost, which is strong, durable and efficient in operation and is adapted to be used with various air heating and cooling devices.

Other objects of the invention will appear during the course of the following specifications.

In the drawings providing an illustrative embodiment of the invention:

Fig. 4 is an end view of the device shown in Fig. 3, while

Figure 1:
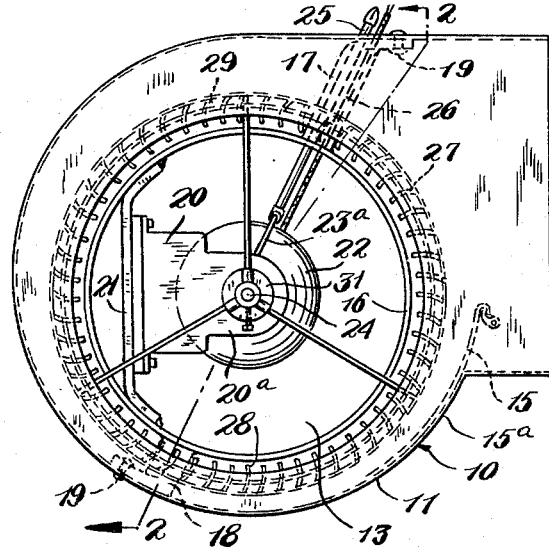
Fig. 1 is an end view of a blower unit illustrating the invention.
Figure 2:
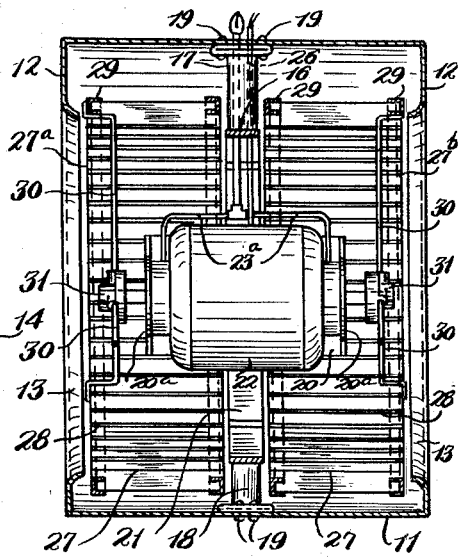
Fig. 2 is a sectional view taken on the line 2—2 of Fig. 1.
Figure 3:
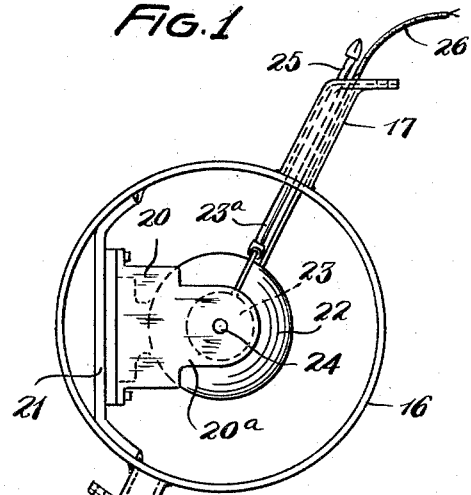
Fig. 3 is a side view of the motor mounted on its supporting frame.
Figure 4:
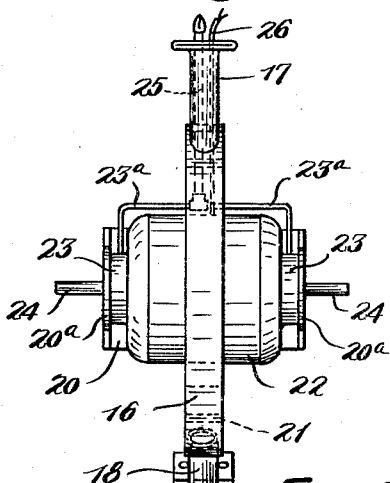
Figure 5:
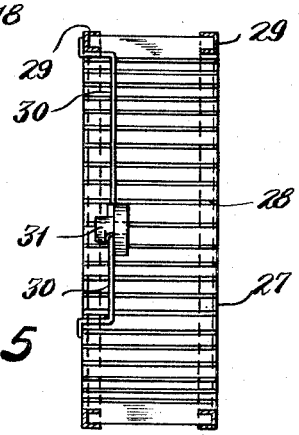
Fig. 5 is an end view partly in section of a separate blower wheel.

In the drawing the numeral 10 refers generally to a double inlet blower unit, having a casing 11 including side walls 12 attached to the outer margins thereof, each provided with annular openings 13 through which air is drawn into the blower unit 10, while an outlet opening 14 provided with a variable cut-off device 15, includes a variable plate 15a adapted to be raised and lowered to vary the pressure and volumetric characteristics of the air issuing from the unit, in a well known manner.

Means for supporting a motor comprise a circular support band 16, operatively connected to the inner wall of the casing 11 by means of arms 17 and 18 suitably secured thereto by means of bolts or rivets 19 or other fastening means, while a U-shaped bracket 20 having spaced arms 20a is mounted on a platform 21 suitably secured to the support band 16 as by welding or brazing. An electric motor 22 including bearings 23 and projecting driven shafts 24, is suspended at each end by the spaced arms 20a of the bracket 20 in an obvious manner, while an oil tube 25 permits oiling of bearings 23 through conduits 23a and electric conductor 26 supplies electric current thereto.

A pair of identical blower wheels 27, each having a series of thin blades 28 suitably secured to a pair of end rings 29 as by soldering, are of usual construction except that such blades are somewhat shorter in length than conventional blower wheel blades. A set of spokes 30 mounted at the ends of each of the blower wheels 27 at their outer ends, extend over the outer surface of the cooperating end ring 29 and are secured thereto as by brazing or welding, while the inner ends of each set of spokes 30 are mounted on one of the hubs 31 secured to motor shafts 24 in a well known manner.

In assembling the blower unit, the motor 22 is mounted in bracket 20 secured to platform 21 mounted in the interior of the annular support band 16. One wheel of the pair of blower wheels 27 is mounted on each of the driven motor shafts 24 and the foregoing assembly is inserted as a unit through the outlet opening 14. The circular support band 16 is then fixedly secured to the interior of casing 11 by securing the arms 17 and 18 thereto by means of rivets or bolts.

It will be noticed that there is no obstruction at the side walls 12 of the motor, which might retard the free flowing of air into the blower unit through annular openings 13. This construction has the advantage of providing equal distribution of the load on both motor bearings and a minimum overhanging of the blower wheels, which is conducive to smooth operation and maximum bearing life. It has been discovered that by providing two balanced blower wheels and mounting the motor centrally thereof, a highly efficient outlet air velocity pattern is produced which reduces high velocity shock losses. The feature of mounting the pair of blower wheels directly on the motor shafts eliminates the expense of providing sheaves, gears and belts and provides low construction and operation costs. Obviously this invention is not limited to the use of blower wheels of the specific type illustrated herein, and various types of blower housings as well as blower wheels may be satisfactorily used with this invention.

It will be apparent to those skilled in the art that the present embodiment of my invention is illustrative only, and that the invention may be variously changed, used or modified without departing from the spirit of the invention or sacrificing the advantages thereof and that my invention is not limited thereto.

What I claim is:

1. A direct drive air blower unit comprising, a casing including side walls having aligned inlet openings through which air is drawn into the unit and an outlet opening in fluid communication with the area between said inlet openings, a circular support band axially disposed in said casing midway between said inlet openings with its axis co-axial with relation to the axis of said inlet openings, support means supporting said band in said casing in said position, a platform member connecting opposite walls of said support band, a motor mounted on said platform member and provided with drive shafts at its opposite ends, said drive shafts being axially aligned with said inlet openings, and a pair of identical blower wheels disposed in said casing and operatively connected to said motor, one blower wheel being operatively connected to the motor shaft on each side of said motor, each blower wheel encircling one side of said motor within said casing and extending longitudinally of the casing from a point substantially midway of the axial length of said motor to an adjacent inlet opening, providing substantially unobstructed flow of air throughout said casing.

2. A direct drive air blower unit comprising, a casing including side walls having aligned inlet openings through which air is drawn into the unit and an outlet opening in fluid communication with the area between said inlet openings, a circular support band axially disposed in said casing midway between said inlet openings with its axis co-axial with relation to the axis of said inlet openings, support means supporting said band in said casing in said position, a platform member connecting opposite walls of said support band, a bracket member mounted on said platform member, a motor mounted on said platform member and provided with drive shafts at its opposite ends supported in said bracket member, said drive shafts being axially aligned with said inlet openings, and a pair of identical blower wheels, each wheel including a pair of end rings connected by blades and being operatively connected to said motor, one blower wheel being operatively connected to the motor shaft on each side of said motor by means of spokes operatively connecting the outer ring of each wheel to a drive shaft, each blower wheel encircling said motor within said casing and extending longitudinally of the casing from a point substantially midway of the axial length of said motor to its cooperating inlet opening, the diameter of said wheels corresponding substantially to the diameter of said inlet openings, whereby a substantially unobstructed flow of air is permitted throughout said casing.

3. A direct drive air blower unit comprising, a casing including side walls having aligned inlet openings through which air is drawn into the unit and an outlet opening in fluid communication with the area between said inlet openings, a circular support band axially disposed in said caisng midway between said inlet openings with its axis co-axial with relation to the axis of said inlet openings, support means supporting said band in said casing in said position, a platform member connecting opposite walls of said support band, a bracket member mounted on said platform member, a motor mounted on said platform member and provided with drive shafts at its opposite ends supported in said bracket member, said drive shafts being axially aligned with said inlet openings, and a pair of identical blower wheels operatively connected to said motor, each wheel including a pair of spaced rings connected by blades, the outer ring of one blower wheel being operatively connected to the motor shaft on each side of said motor, each blower wheel encircling one side of said motor within said casing and being provided with blades extending longitudinally of the casing from a point substantially midway of the axial length of said motor to its cooperating inlet opening, thereby providing air-moving blades extending substantially the entire axial length of said casing, providing substantially unobstructed movement of air throughout said casing.

4. A direct drive air blower unit comprising, a casing including side walls having aligned inlet openings through which air is drawn into the unit and an outlet opening in fluid communication with the area between said inlet openings, a relatively narrow circular support band axially disposed in said casing midway between said inlet openings with its axis co-axial with relation to the axis of said inlet openings, support means supporting said band in said casing in said position, a platform member connecting opposite walls of said support band, a motor mounted on said platform member and provided with drive shafts at its opposite ends and axially aligned with said inlet openings, and a pair of identical blower wheels, each including blades mounted on a pair of spaced end rings operatively connected to said motor, the outer end ring of one blower wheel being operatively connected to the motor shaft on each side of said motor, each blower wheel encircling one side of said motor, the juxtaposed portions of said wheels being spaced apart a distance corresponding substantially to the width of said band, whereby air impelling blades extend substantially the entire axial length of said blower, the position and arrangement of said motor and its support means permitting air to be freely circulated within said casing without substantial obstruction.

5. An air blower device including a casing having a substantially cylindrically shaped portion provided with inlet openings at its ends and a communicating outlet opening, an annular support band disposed midway between said inlet openings of said casing in said cylindrical portion in co-axial relation to the axis of said inlet openings, arm members supporting said band in said position in said casing, a platform member connecting opposite walls of said support band, a bracket member mounted on said platform member having aligned apertures co-axially disposed with the axis of said inlet openings, a motor mounted on said platform member and provided with drive shafts at opposite ends mounted in said bracket, and a pair of identical blower wheels operatively mounted on said casing, each wheel including a plurality of blades having their ends secured to a pair of end rings, one blower wheel being operatively connected to the motor shaft on each side of said motor, each wheel surrounding a portion of said motor, each wheel being disposed around substantially one-half the axial length of said motor, said wheels being separated by a distance corresponding substantially to the width of said support band, whereby air-moving blades are provided extending throughout substantially the entire axial length of said blower and relatively free movement of air is permitted through said inlet openings and out said outlet opening, due to the position and arrangement of said motor, its support means and said blower wheels.

6. An air blower device including a casing having a substantially cylindrically shaped portion provided with inlet openings at its ends and a communicating outlet opening, an annular support band disposed midway between said inlet openings of said casing in co-axial relation to the axis of said openings, radially disposed arm members supporting said band in said position in said casing, a platform member connecting opposite walls of said support band and having a width not exceeding the width of said band, a bracket member mounted on said platform member and provided with a pair of spaced walls having aligned apertures co-axially disposed with the axis of said inlet openings, a motor mounted on said platform member and provided with drive shafts at opposite ends mounted in said bracket apertures, and a pair of identical blower wheels mounted in said casing, each including a plurality of thin blades having their ends secured to a pair of end rings, one blower wheel being operatively connected to the motor shaft on each side of said motor by means of spokes operatively connecting the outside ring of each wheel to one drive shaft, the diameters of the blower wheels corresponding to the diameters of said inlet openings, and each wheel surrounding a substantial portion of said motor, each wheel being disposed around substantially one-half the axial length of said motor, said wheels being separated solely by a distance corresponding substantially to the width of said support band whereby balanced air-moving equipment is provided extending throughout substantially the entire axial length of said blower providing substantially free circulation of air throughout said device.

References Cited in the file of this patent

UNITED STATES PATENTS

| | | |
|---|---|---|
| 1,906,533 | Burke | May 2, 1933 |
| 2,133,460 | Losee | Oct. 18, 1938 |
| 2,297,050 | Cotton et al. | Sept. 29, 1942 |
| 2,325,222 | Bretzlaff et al. | July 27, 1943 |
| 2,458,041 | Wessel | Jan. 4, 1949 |
| 2,654,529 | Smith | Oct. 6, 1953 |